US010551830B2

(12) United States Patent
Bense et al.

(10) Patent No.: US 10,551,830 B2
(45) Date of Patent: Feb. 4, 2020

(54) METHOD, SYSTEM AND COMPUTER PROGRAM FOR LEARNING PHASE OF AN ACOUSTIC OR VIBRATORY ANALYSIS OF A MACHINE

(71) Applicant: SAFRAN AIRCRAFT ENGINES, Paris (FR)

(72) Inventors: William Bense, Montgeron (FR); Jean-Michel Boiteux, Coutencon (FR); Audrey Dupont, Brie Comte Robert (FR); Julien Christian Pascal Griffaton, Paris (FR); Jerome Henri Noel Lacaille, Rosny Sous Bois (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 248 days.

(21) Appl. No.: 15/545,837

(22) PCT Filed: Jan. 28, 2016

(86) PCT No.: PCT/FR2016/050176
§ 371 (c)(1),
(2) Date: Jul. 24, 2017

(87) PCT Pub. No.: WO2016/120566
PCT Pub. Date: Aug. 4, 2016

(65) Prior Publication Data
US 2018/0017961 A1    Jan. 18, 2018

(30) Foreign Application Priority Data
Jan. 30, 2015  (FR) .................................... 15 50735

(51) Int. Cl.
*G05B 23/02*     (2006.01)
*G01M 15/14*     (2006.01)
(Continued)

(52) U.S. Cl.
CPC ......... *G05B 23/0235* (2013.01); *F02D 41/22* (2013.01); *G01M 15/14* (2013.01); *G07C 3/00* (2013.01); *F02D 2200/025* (2013.01)

(58) Field of Classification Search
CPC ....... G05B 23/0235; G07C 3/00; F02D 41/22; F02D 2200/025; G01M 15/14
See application file for complete search history.

(56) References Cited

U.S. PATENT DOCUMENTS 8,682,824 B2 * 3/2014 Shibuya ................. G06N 20/00
                                                            706/45
8,744,813 B2 * 6/2014 Lacaille ............. G05B 23/0254
                                                            702/183
(Continued)

FOREIGN PATENT DOCUMENTS

FR    2 947 335 A1    12/2010
JP    2014-59910 A     4/2014
WO   2011/054867 A1   5/2011

OTHER PUBLICATIONS

International Search Report dated Jun. 8, 2016 in PCT/FR2016/050176 filed Jan. 28, 2016.

(Continued)

*Primary Examiner* — Freddie Kirkland, III
(74) *Attorney, Agent, or Firm* — Oblon, McClelland, Maier & Neustadt, L.L.P.

(57) ABSTRACT

A method of analysis of the state of operation of a machine including a learning step supplementing a reference database with one or more thresholds for one or more indicators calculated on the basis of signals delivered by a sensor associated with the machine, the learning step including the following operations implemented by a computer processing unit; an acquisition of signals characteristic of normal operation and of abnormal operation of the machine; of each of the signals characteristic of normal operation, formation of (Continued)

at least one so-called deviation signal by implementing a mathematical operation having as attributes the signal characteristic of normal operation and one of the signals characteristic of normal or abnormal operation other than the signal characteristic of the normal operation; for each of the deviation signals, calculation of an indicator; determination of an indicator threshold representative of a limit between normal operation and abnormal operation of the machine.

13 Claims, 6 Drawing Sheets

(51) Int. Cl.
*F02D 41/22* (2006.01)
*G07C 3/00* (2006.01)

(56) References Cited

U.S. PATENT DOCUMENTS

| | | | |
|---|---|---|---|
| 9,032,803 B2* | 5/2015 | Griffaton | G01M 13/045 |
| | | | 702/56 |
| 9,176,926 B2* | 11/2015 | Lacaille | G05B 23/0221 |
| 9,659,250 B2* | 5/2017 | Shibuya | G05B 23/0254 |
| 9,779,495 B2* | 10/2017 | Shibuya | G05B 23/0235 |
| 9,940,184 B2* | 4/2018 | Shibuya | G06F 11/00 |
| 10,281,360 B2* | 5/2019 | Lacaille | G01M 15/12 |
| 2007/0255563 A1 | 11/2007 | Dooley | |
| 2011/0191076 A1* | 8/2011 | Maeda | G05B 23/0254 |
| | | | 703/2 |
| 2012/0271587 A1* | 10/2012 | Shibuya | G05B 23/0229 |
| | | | 702/127 |
| 2012/0272736 A1* | 11/2012 | Griffaton | G01M 13/045 |
| | | | 73/593 |
| 2012/0290879 A1 | 11/2012 | Shibuya et al. | |

OTHER PUBLICATIONS

French Search Report dated Nov. 26, 2015 in FR 1550735 filed Jan. 30, 2015.

Wegerich, Stephan W. et al., "Nonparametric Modeling of Vibration Signal Features for Equipment Health Monitoring," Aerospace Conference, 2008 IEEE, vol. 7, Jan. 2003, XP055231408, pp. 3113-3121.

* cited by examiner

METHOD, SYSTEM AND COMPUTER PROGRAM FOR LEARNING PHASE OF AN ACOUSTIC OR VIBRATORY ANALYSIS OF A MACHINE

TECHNICAL FIELD

The invention relates to the field of monitoring of a machine, for example an engine such as an aircraft engine. In particular the invention relates to a method and a system for analysis of a machine, for example acoustic or vibratory analysis, in order to detect, recognise or foresee anomalies in it.

STATE OF THE PRIOR ART

A machine is a mechanical system which is subject to stresses which may cause wear in its components. A general method of monitoring the state of a machine as effectively as possible is therefore sought, in order to detect any damage to it, to recognise these types of damage from a set of possible types of damage for the machine or to predict their occurrence.

Although a machine, for example an aircraft engine, exhibits the drawback of generating noise, it may be imagined however that this drawback could be used to perform a diagnosis or prognosis of damage in a non-intrusive manner. Indeed, aircraft engines and rotating machines in general may exhibit some types of damage which can be identified by ear.

Thus from publication US 2007/0255563 A1 a system is known for monitoring an aircraft turbojet engine according to which acoustic signals from the turbojet engine in operation are recorded using two microphones positioned beneath the turbojet engine nacelle. The signals acquired are compared with reference signals using a voice recognition algorithm. Thus signatures representative of the state of the turbojet engine can be identified from the signals acquired.

Similarly, the realisation of such monitoring has been envisaged by using not only acoustic signals generated by the machine but also vibratory signals passing through the various components of the machine. Refer to patent application WO 2011/054867 A1 in relation to this.

Such monitoring systems use a database wherein are recorded the characteristics of the limit between signals representative of normal operation and signals representative of abnormal operation. In more concrete terms, the database stores one or more thresholds for one or more indicators calculated from signals provided by a sensor associated with the machine, for example by a microphone arranged within the machine. The database may in particular be provided with information during a learning phase, by statistically determining the thresholds of a certain number of indicators. The database is queried during a test phase using indicators calculated from a signal provided by the sensor, in order to determine whether a machine being tested is in a normal or abnormal operational state.

One difficulty during the learning phase is due to the fact that few data representative of normal operation, and above all of abnormal operation, are available. There may be insufficient to obtain the statistics. This is the case, for example, when learning is carried out using a test installation or a machine which is undergoing development and whose configuration may undergo change. With a limited amount of learning data, and in particular with a small amount of abnormal data available therefore, the statistically estimated thresholds are not optimised. This limits the quality of determination of the operational state in the test phase.

Access to a high quality database is therefore sought in order to achieve a high level of correct detection of anomalies and a low level of false detection of anomalies.

DESCRIPTION OF THE INVENTION

The aim of the invention is to respond to this set of problems. To do this it proposes a method of analysis of the operational state of a machine, such as an aircraft engine, comprising a learning step to provide data, to a reference database, on one or more thresholds for one or more indicators calculated from signals provided by one or more sensors associated with the machine, characterised in that the learning step comprises the following operations, implemented by a computerised processing unit:

acquisition of signals characteristic of normal operation of the machine and of signals characteristic of abnormal operation of the machine;

for each of the signals characteristic of normal operation, the calculation of at least one so-called deviation signal through the use of a mathematical operation whose attributes are the signal characteristic of normal operation and one of the signals characteristic of normal or abnormal operation other than said signal characteristic of normal operation;

for each of the deviation signals, the calculation of an indicator;

determination, from the deviation signal indicators, of an indicator threshold allowing signals formed from a signal characteristic of normal operation and from another signal characteristic of normal operation, to be distinguished from deviation signals formed from a signal characteristic of normal operation and from a signal characteristic of abnormal operation;

recording of the indicator threshold in the reference database.

Some preferred, but non-limiting, aspects of this method are as follows:

it moreover comprises a machine test step, using a signal provided by a sensor associated with the machine, where the test step comprises the following operations:
   formation of a test signal by use of said mathematical operation whose attributes are the signal provided by the sensor and a reference signal;
   calculation of the test signal indicator;
   comparison of the test signal indicator with the indicator threshold recorded in the reference database, in order to determine the operational state, normal or abnormal, of the machine;

the signals provided by the sensor are transformed into frequency signals prior to the calculation of the deviation signals;

the signals provided by the sensor are sampled over a measurement period during which the engine speed of the machine is variable, the signals thus sampled are synchronised according to the variations in the engine speed over the measurement period, and the synchronised sampled signals are transformed into frequency signals in order to obtain frequency lines ordered according to the shaft rotation speed;

the indicator or indicators of a signal comprise one or more indicators from amongst a statistical moment of the signal and the energy of the signal;

the calculation of a signal indicator is performed by counting the number of points in the signal subtracted from a signal characteristic of normal operation that are present outside an envelope of said signal characteristic of normal operation;

the calculation of a signal indicator is performed by counting the number of peaks from amongst n peaks in the signal characteristic of normal operation which coincide with a peak from amongst p peaks of the signal subtracted from said signal characteristic of normal operation;

the learning step comprises a secondary phase during which a signal characteristic of normal operation is formed by combination of several signals characteristic of normal operation;

the sensor provides an acoustic signal or a vibratory signal.

The invention also relates to a computer program product comprising code instructions for the execution of the steps in the method, when said program is executed on a computer. And it applies to a system for the analysis of the operational state of a machine, such as an aircraft engine, comprising a module for acquisition of a signal provided by a sensor associated with the machine and a reference database wherein are recorded one or more thresholds for one or more indicators calculated from signals provided by the sensor associated with the machine, characterised in that it moreover comprises:

a module for calculating deviation signals configured to form, for each of the signals characteristic of normal operation, at least one so-called deviation signal through the use of a mathematical operation whose attributes are the signal characteristic of normal operation and one of the signals characteristic of normal or abnormal operation other than said signal characteristic of normal operation;

a module for calculating indicators configured to calculate, for each of the deviation signals, an indicator;

a module for determination of the thresholds of indicators configured to determine, from the deviation signal indicators, an indicator threshold representative of a limit between normal operation and abnormal operation of the machine, said threshold allowing the deviation signals, formed from a signal characteristic of normal operation and from another signal characteristic of normal operation, to be distinguished from deviation signals formed from a signal characteristic of normal operation and from a signal characteristic of abnormal operation, and to record the indicator threshold in the reference database.

BRIEF DESCRIPTION OF THE ILLUSTRATIONS

Other aspects, aims, advantages and characteristics of the invention will become more apparent on reading the following detailed description of its preferred embodiments, given as non-restrictive examples, and undertaken with reference to the appended drawings, wherein.

DETAILED DESCRIPTION OF PARTICULAR EMBODIMENTS

Figure 1:
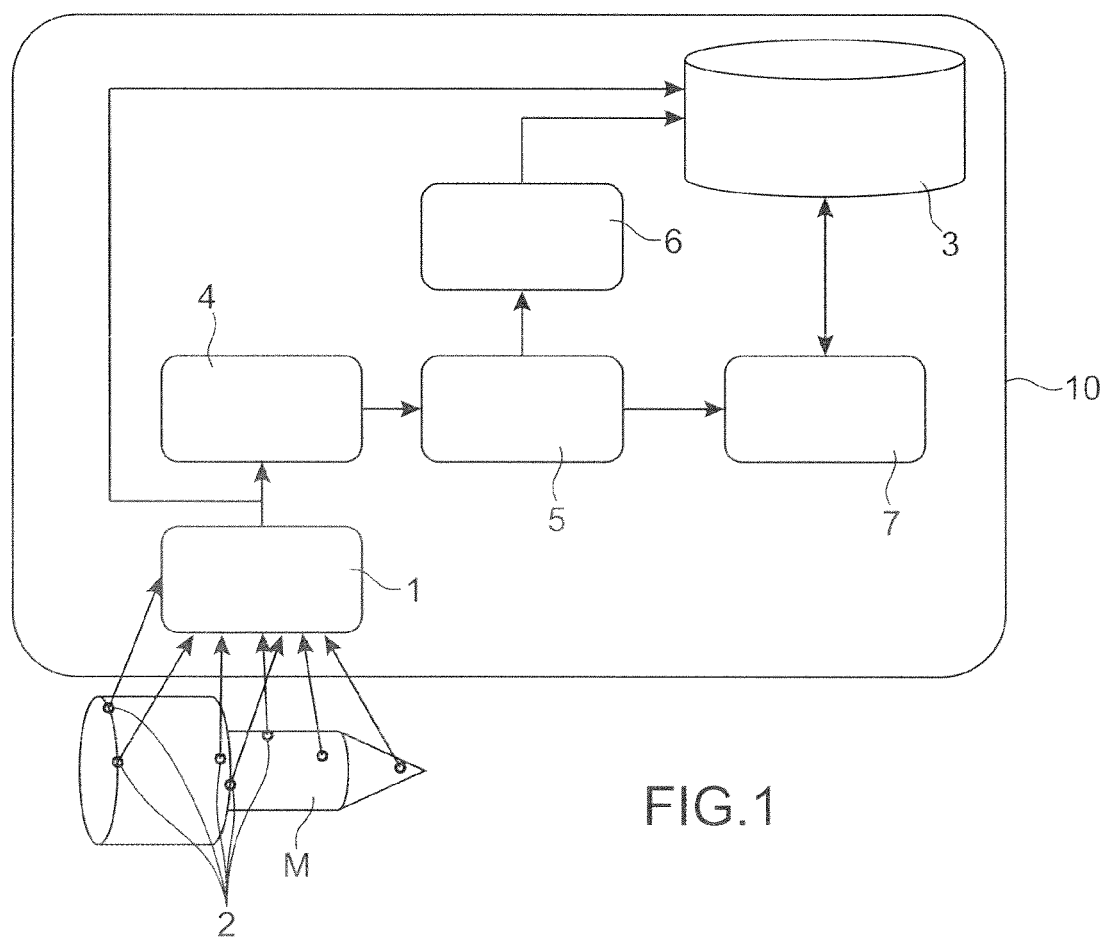
FIG. 1 shows an example of equipment means implemented in one possible embodiment of the system according to the invention.

FIG. 1 shows an example of equipment means implemented in various possible embodiments of the system and method for analysis of the operational state of a machine M tested in accordance with the invention.

The tested machine M may be an airborne or terrestrial vehicle engine, for example an aircraft engine as shown schematically in FIG. 1. The invention is not, however, limited to such an illustrative example, but applies in general to the investigation of any mechanical system which generates noise or vibrations.

At least one sensor 2 is associated with the machine M. It may be, for example, a microphone positioned within the machine M, for example within an aircraft engine nacelle, either directly on the internal face of the nacelle or on the engine. It may also be a vibration sensor, such as accelerometer or a strain gauge, preferably positioned on the engine.

A plurality of sensors is preferably used, for example ten or so sensors. In particular this allows the sensors to be distributed between the various components of the machine, for example between the blower casing, the main casing and the cone for ejection of the gases from an aircraft engine.

The sensor or sensors 2 are ideally located near to the components of the machine to be monitored. Nevertheless, a sensor is not necessarily arranged on the component being monitored. On the contrary, an ambience sensor could be used which has the advantage of allowing several components to be monitored. In particular a sensor could be placed close to one of the more critical components, which does not prevent other components to be monitored.

The system comprises a computerised processing unit 10 equipped with an acquisition module 1 for at least one signal provided by at least one sensor 2 associated with the machine M. The processing unit 10 also comprises a reference database 3 wherein one or more thresholds are recorded for one or more indicators calculated from signals provided by at least one sensor 2 associated with the machine. In the test phase, the fact that one of these thresholds is exceeded or not by the indicators, calculated from signals corresponding to a machine being tested, is used to determine whether the machine is operating normally or not. In certain embodiments of the invention, the detection of anomalies is accompanied by a classification of the anomaly detected (between, for example, one class of defective turbomotors and another class of defective compressor motors).

The system and method according to the invention more specifically allow detection of anomalies from acoustic/vibratory symptoms, whilst being optimised to operate with small amounts of learning data for forming a reference database.

Figure 2:
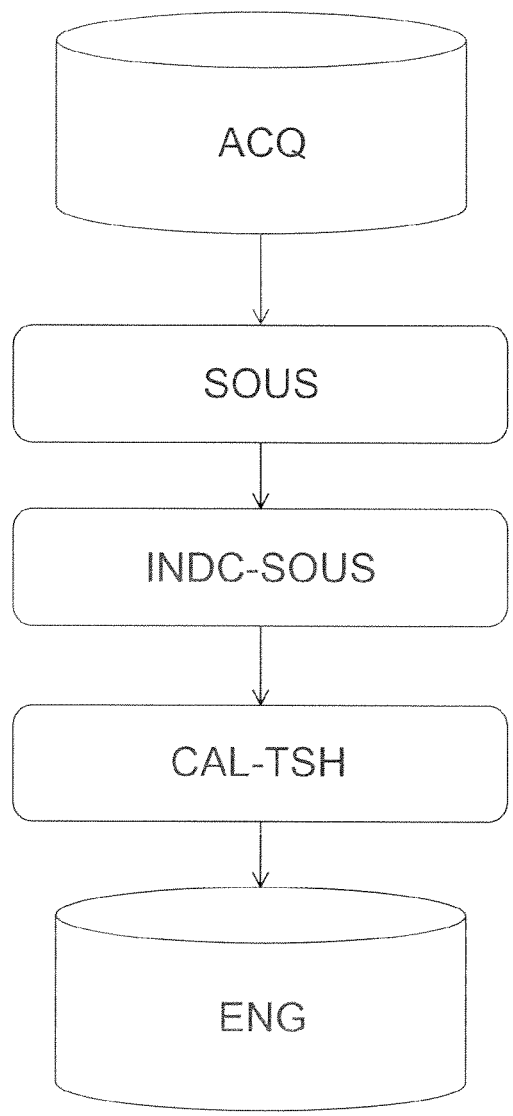
FIG. 2 shows the different operations implemented in the learning step of the method according to the invention.

With reference to FIG. 2 the learning step comprises the following operations implemented by the different modules 4, 5, 6 of the computerised processing unit 10. The learning step first of all comprises an "ACQ" operation for the acquisition, using the acquisition module 1 described earlier, of signals characteristic of normal operation of the machine and of signals characteristic of abnormal operation of the machine. These signals are recorded in the reference database 3. The signals characteristic of normal operation of the machine are, for example, acquired during the first flights of the machine when there is the greatest chance of the latter's components being healthy. On the contrary, signals characteristic of abnormal operation of the machine are acquired using a machine that is known, from an inspection for example, to exhibit an anomaly.

The learning step then comprises, for each of the signals characteristic of normal operation and after any operations for filtering and normalisation of the signals acquired which will be described later, a "SOUS" operation for calculating at least one so-called deviation signal by the use of a mathematical operation whose attributes are the signal characteristic of normal operation and one of the signals characteristic of normal or abnormal operation other than said signal characteristic of normal operation.

This "SOUS" operation is implemented by a deviation signals calculation module 4. The mathematical operation may be carried out between the signal characteristic of normal operation and each of the signals characteristic of normal or abnormal operation other than said signal characteristic of normal operation. In one embodiment which will be used in the rest of the disclosure, the mathematical operation is subtraction. The "SOUS" operation therefore preferably consists, for each of the signals characteristic of normal operation, of forming deviation signals by subtraction from the signal characteristic of normal operation of each of the signals characteristic of normal or abnormal operation other than said signal characteristic of normal operation.

In one possible embodiment, the "SOUS" operation also comprises for each of the signals characteristic of abnormal operation, calculation of at least one so-called deviation signal through the implementation of a mathematical operation whose attributes are the signal characteristic of abnormal operation and one of the signals characteristic of abnormal operation other than said signal characteristic of abnormal operation.

Following the "SOUS" operation, the learning step comprises an "INDC-SOUS" operation, implemented by an indicator calculation module 5, consisting, for each of the deviation signals, of calculating one or more indicators.

This "INDC-SOUS" operation is followed by an operation for estimating the damage thresholds "CAL-TSH", implemented by a module for determination of indicator thresholds 6, consisting, for each of the indicators of deviation signals, of determining an indicator threshold representative of a limit between normal operation and abnormal operation of the machine. The threshold allows the deviation signals, formed from the signal characteristic of normal operation and from another signal characteristic of normal operation, to be distinguished from deviation signals formed from the signal characteristic of normal operation and from a signal characteristic of abnormal operation.

By way of examples, the "CAL-TSH" operation for estimating the damage thresholds can be performed by calculating the spatial median between the first and last indicator, or by excluding aberrant points, or by using a support vector machine, or a neural network, or decision trees.

The learning step then comprises an "ENG" operation, implemented by the indicator thresholds determination module 6, consisting of recording the threshold or thresholds thus calculated in the reference database 3.

Figure 3A:
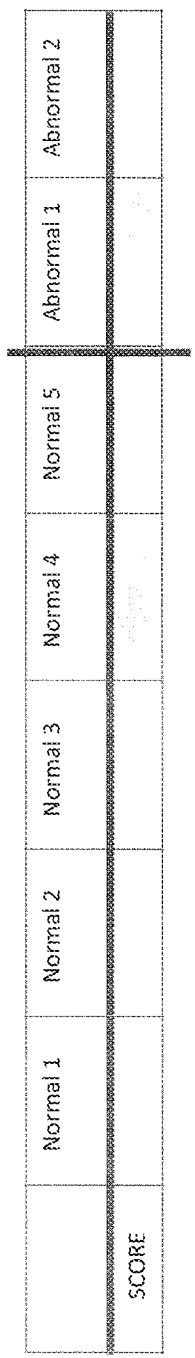
FIGS. 3a and 3b show the data available for the calculation of indicators according to a conventional implementation and according to an implementation according to the invention.
Figure 3B:
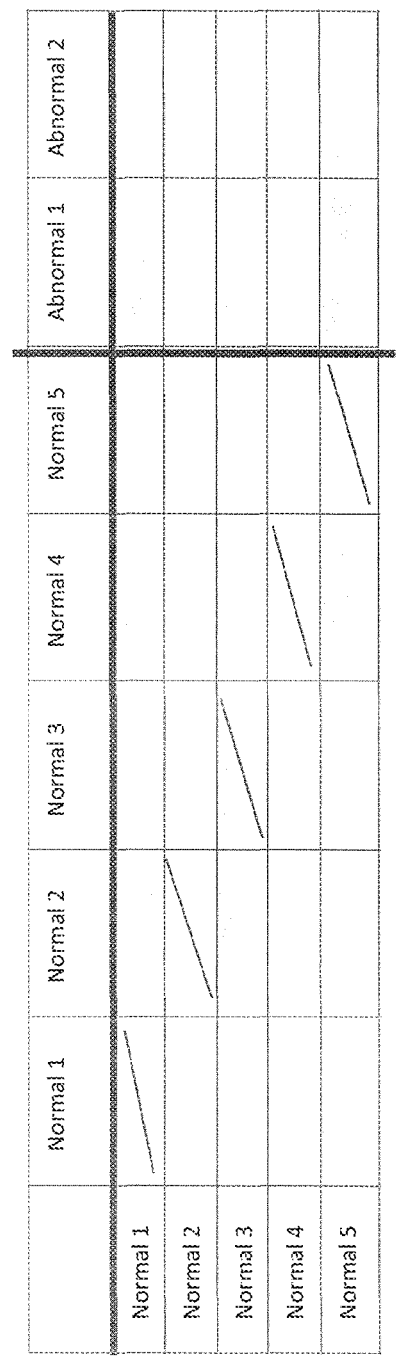

FIGS. 3a and 3b show the advantages of the learning phase according to the invention in the context of an example where, at the end of the "ACQ" acquisition operation, five signals characteristic of normal operation, Normal 1 to Normal 5, and two signals characteristic of abnormal operation, Abnormal 1 and Abnormal 2, are recorded in the database 3.

As shown in FIG. 3a, a conventional algorithm assigns a score to each signal (through the calculation of an indicator, for example its variance) and seeks to differentiate the five scores of the healthy signals from the two scores of the abnormal signals in order to calculate a limit or threshold between the scores for normal signals and the scores for abnormal signals. In this way, during the test phase, in order to classify an unknown signal, the score is calculated for this unknown signal and it is assigned normal/abnormal status depending on its position relative to the threshold determined during the learning step.

Within the context of the invention, and as shown in FIG. 3b, pairs of signals are formed all composed in the same manner: a first healthy signal and a healthy or abnormal comparison signal. In one embodiment example the comparison signal is subtracted from the first healthy signal to form a deviation signal. This time a score is assigned to each pair of signals (deviation signal) and it is sought to differentiate the twenty pairs of healthy type signal subtracted from the first healthy signal, from the ten pairs of abnormal type signal subtracted from the first healthy signal. It should be noted that a signal is not compared with itself, hence the number of twenty pairs of signals of the healthy type signal subtracted from a first healthy signal, and the crossed-through, unused boxes in the table in FIG. 3b. Thus the invention relies on the concept of multiplying the number of signals from which indicators are calculated and thresholds determined, by having recourse to deviation signals which are more numerous than the acquired signals. Acquired signals can therefore be compared two by two and this difference classified, rather than classify each of the acquired signals taken separately.

By having recourse to the deviation signals, obtained for example by comparing the signals two by two, the number of signals that it is sought to differentiate in order to determine the threshold is multiplied. Returning to the above example, instead of determining a threshold by seeking to differentiate five healthy signals from two abnormal signals, a threshold is determined by seeking to differentiate twenty deviation signals, corresponding to the twenty pairs of healthy type signals subtracted from a first healthy signal, from ten deviation signals corresponding to the ten pairs of abnormal-type signals subtracted from a first healthy signal. A more precise determination of the threshold results from this increase in the number of available signals.

Naturally once the learning step has finished, the testing of the machine may be carried out. This test is carried out by using indicators defined in an identical manner to the indicators calculated from the deviation signals. Thus a test step of a machine M by means of a signal provided by a sensor associated with the machine being tested comprises the following operations:

formation, by the module for calculating deviation signals 4, of a test signal created by implementation of said mathematical operation, for example subtraction, whose attributes are the signal provided by the sensor and a reference signal recorded previously in the reference database during the learning step;

calculation, by the modules for calculating indicators 5, of one or more indicators of the test signal;

comparison, by a module for detection of anomalies 7, of the test signal indicator or indicators with the corresponding threshold recorded in the reference database, in order to determine the operational state, normal or abnormal, of the machine M being tested.

The reference signal is typically a signal characteristic of normal operation of the machine. It may also involve a signal characteristic of abnormal operation of the machine, for example when it is sought to identify a fault signature.

The reference signal characteristic of normal operation (respectively abnormal) may be one of the signals characteristic of normal operation (respectively abnormal) used during the course of the learning phase, or may be a signal created from one and/or the other of signals characteristic of normal operation (respectively abnormal) used during the learning phase such as, for example, the mean of signals characteristic of normal operation (respectively abnormal) used during the course of the learning phase.

Figure 4:
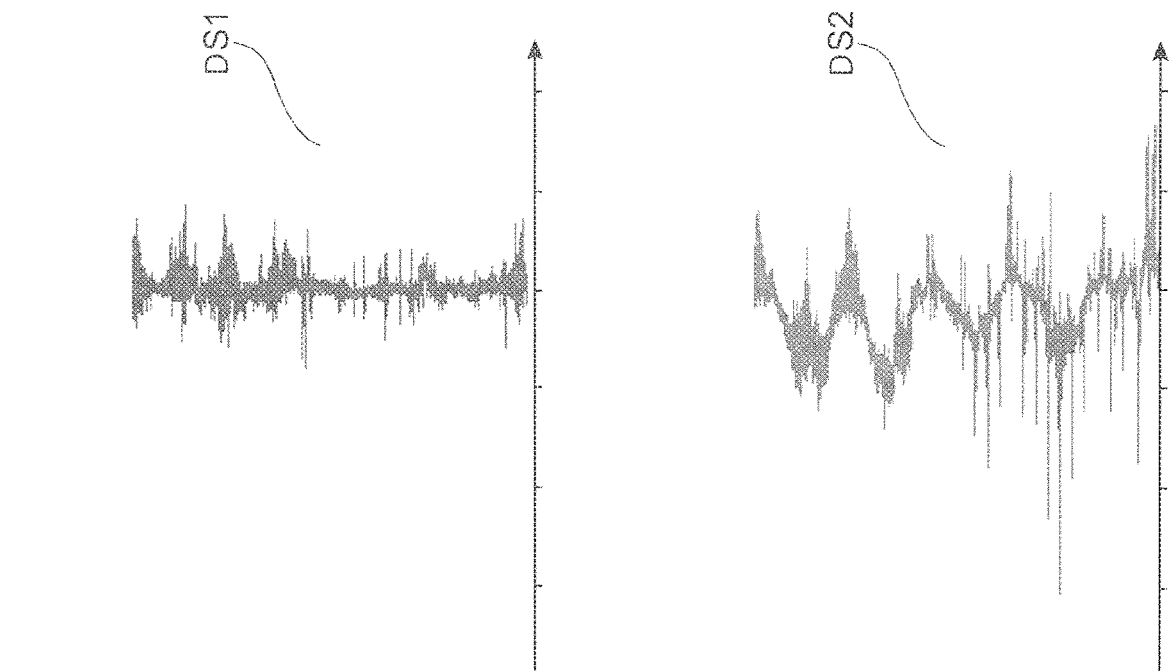
FIG. 4 shows the spectrum of a signal characteristic of healthy operation of the machine and two signals resulting from the subtraction from said signal characteristic of healthy operation of a signal representative of normal operation and of a signal representative of abnormal operation respectively.
Figure 4:
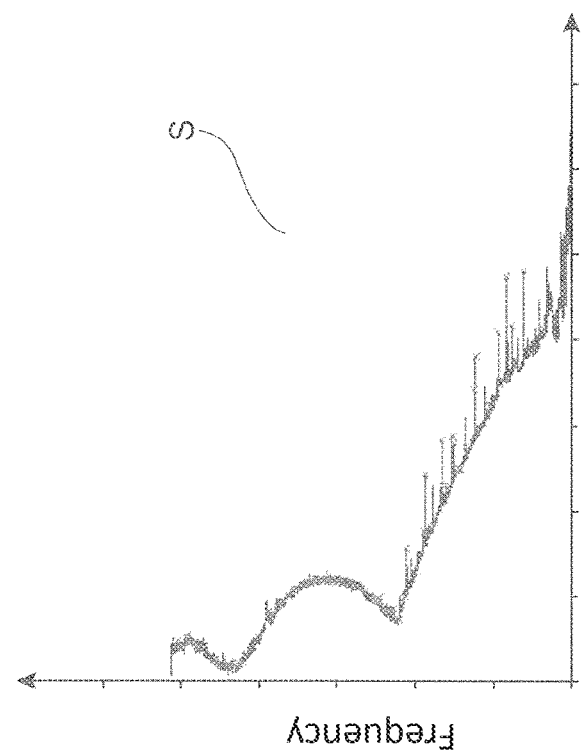

In the context of the invention, the signals provided by the sensor are preferably transformed into frequency signals prior to the formation of the deviation signals and the test signals. The comparison of the signals with each other and the calculation of the indicator or indicators are thus achieved in the spectral domain. Thus there is shown in FIG. 4 the spectrum S of a reference signal characteristic of normal operation of the machine, where the spectrum $\Delta S1$ of the signal corresponds to the difference between the reference signal and another signal representative of normal operation of the machine, and where spectrum $\Delta S2$ of the signal corresponds to the difference between the reference signal and another signal representative of abnormal operation of the machine.

In one embodiment the learning step and the test step comprise a filtering (noise removal) and normalisation operation of the acquired signals, implemented, respectively, before the formation of the deviation signals and before the formation of the test signals.

This filtering may be performed using a Kalman filter or a particulate filter. Alternatively, it may take the form of a Fourier transform, a principal component analysis, a wavelet transform or any method for normalisation of vibratory signals.

In another embodiment this filtering takes the form of a projection into the order domain which facilitates reading of spectrograms and in particular of lines of high energy. According to this embodiment the signals provided by the sensor are sampled over a measurement period during which the engine speed of the machine is variable, the signals thus sampled are synchronised according to the variations in the engine speed over the measurement period, and the synchronised sampled signals are transformed into frequency signals in order to obtain frequency lines ordered according to the engine speed.

Further details of this projection into the order domain will be found in patent application WO 2011/054867 A1 cited earlier. It will be assumed here that it involves making a measurement at variable speed, sampling the measured signal at constant frequency then re-sampling at a frequency proportional to the speed. This requires determination of an angular travel curve, for example by integration of the curve representing the changes in engine speed as a function of time, then projecting the signal provided by the sensor onto the angular travel curve by carrying out further sampling which consists of sampling at points spaced at regular intervals on the angular travel curve.

The description below relates to the processing of the deviation signals and test signals for the calculation of one or more indicators of these signals. In general the indicator or indicators must reduce the very dense information contained in these signals, whilst retaining sufficient characteristic information to discriminate healthy signals from abnormal signals.

By way of examples of indicators of deviation signals and of test signals, a statistical moment of these signals may be cited, such as their variance, asymmetry (skewness), or kurtosis or yet again the energy of these signals. In all cases it is preferable that the performance of the sensors (dynamic, passband etc.) is appropriate to the type of indicator established.

Another example of the calculation of an indicator involves counting the number of points in the signal compared with a signal characteristic of normal operation that are present outside an envelope of said signal characteristic of normal operation. In order to do this, an envelope is drawn around the healthy signal (for example by offsetting it by a fixed distance d upwards and downwards, or by calculating its spectral envelope) and counting the number of points in the compared signal which emerge from this envelope.

Another example of calculation of an indicator involves counting the number of peaks from amongst n peaks in the signal characteristic of normal operation which coincide with a peak from amongst p peaks of the signal compared with said signal characteristic of normal operation. The n highest peaks of the healthy signal and the p highest peaks of the compared signal are preferably used. Alternatively, the peaks used could be the local minima, which would allow detection not only of the energy maxima but of sharp drops. In practice the peaks may be slightly offset from one signal to another, and the algorithm is created in such a way as to then tolerate a small offset of the comb-pattern, that is, of the set of peaks.

Advantageously, different n and p values are chosen in order not to construct a table of symmetric indicators, thus avoiding reducing the number of data available in the learning phase to determine the threshold on the indicator representative of a limit between normal operation and abnormal operation of the machine.

Figure 5A:
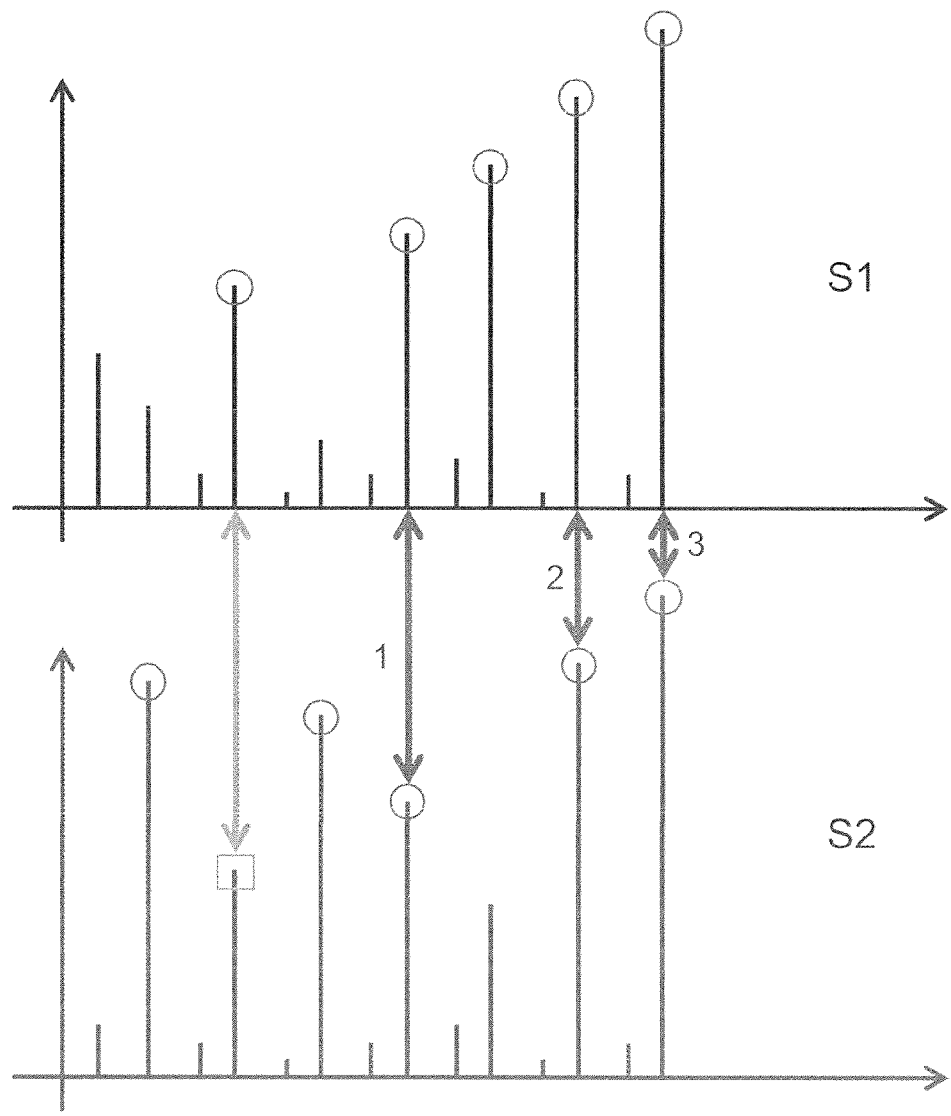
FIGS. 5a and 5b show the calculation of an indicator example which may be carried out within the context of the invention.
Figure 5B:
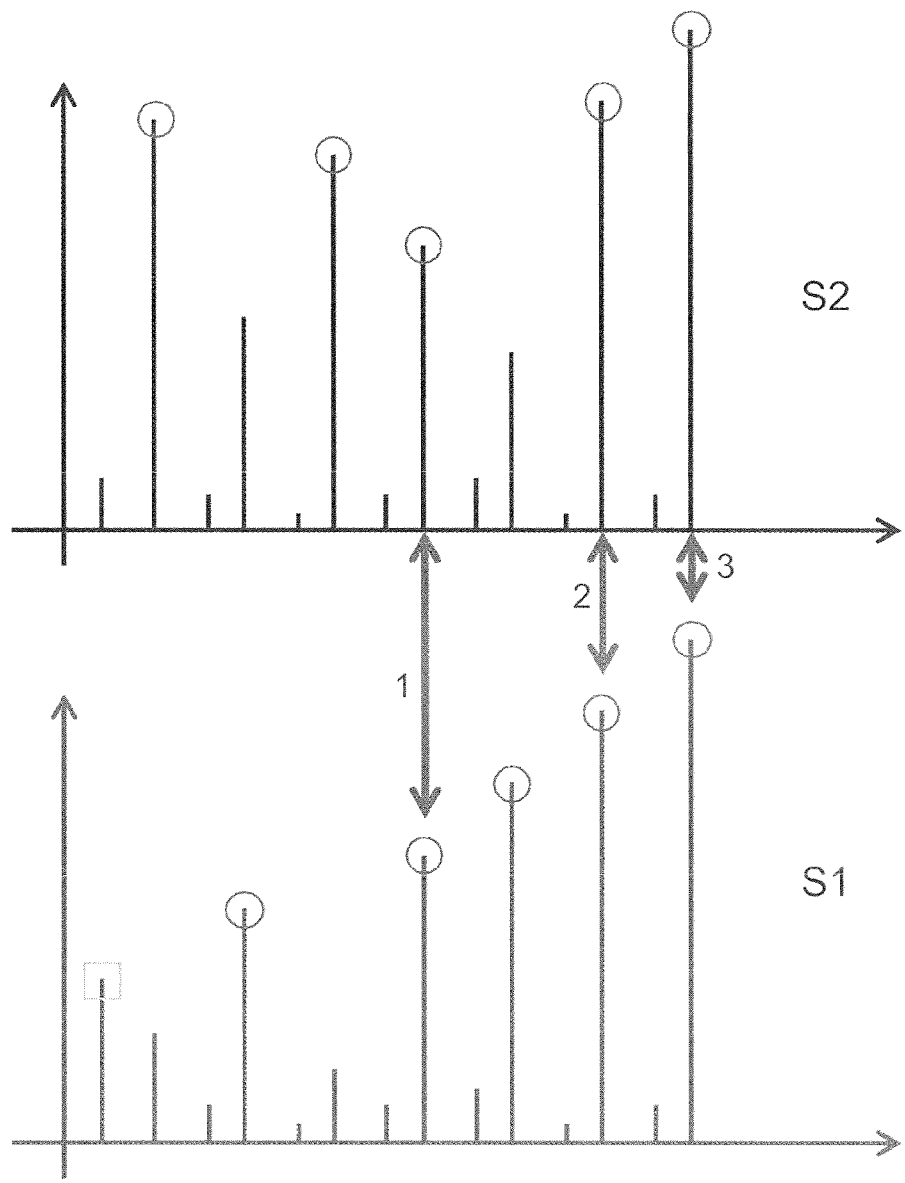

Thus FIG. 5a shows the case in which a signal S1 is taken as a reference signal with which a signal S2 is compared and FIG. 5b shows the case in which the signal S2 is taken as the reference signal with which the signal S2 is compared.

It can be seen from FIG. 5a that if the 5 highest peaks of each of the signals S1 and S2 is compared then there are three common peaks. On the other hand, if the 5 highest peaks of the reference signal S1 are compared with the 6 highest peaks of the compared signal S2 then there are four common peaks.

In FIG. 5b, whether or not the same numbers of the highest peaks are taken for the compared signal as for the reference signal, it can be observed in both cases that there are three peaks in common on the five highest peaks of the reference signal.

By taking different n and p values, different scores are obtained depending on whether S2 is compared with S1 or S1 with S2. This diversifies the distribution of scores and therefore improves the description of the abnormal data space.

Another example of an indicator that can be calculated directly from acquired signals relies on extreme value theory. For this the signal spectrum is divided into numerous small frequency intervals (for example 400 intervals). Using extreme value theory, the distribution of the extremes of amplitudes (minimum and maximum) of all healthy reference spectra are modelled over each interval. A tolerance threshold is set in the tail of both distributions, above (or respectively below) which the points of the spectrum tested are to be regarded as abnormal. The number of abnormal points is taken as the indicator.

In one embodiment of the invention, the detection of anomalies performed during a machine test step is accompanied by a classification of the anomaly detected (between, for example, one class of defective turbomotors and another class of defective compressor motors). Several mathematical models may be used to automate this classification, in particular discriminant analysis (where each class of anomaly is modelled by a Gaussian equation), data partitioning methods (for example using k-means) or supervised learning models which use Support Vector Machines (SVMs) etc.

In one embodiment of the invention several learning phases of the reference data base can be distinguished.

In a primary phase which corresponds, for example, to the use of a test installation or to the development of the machine, there is little healthy or abnormal learning data available. The database is then provided with information by implementation of the learning step as described earlier.

In a secondary phase, which corresponds for example to the start of machine operation, there is a lot of healthy learning data available, but little abnormal data. The learning step can then be modified to form a signal characteristic of normal operation by combination of several distinct signals characteristic of normal operation (mean or median of healthy reference signals from the learning database, for example). Such a combination is in effect more representative of the normality of operation of the machine than an isolated healthy signal. The test step is then modified in a similar manner in order to calculate an indicator for the signal by subtracting from said combination the signal acquired from the tested machine.

In a later phase which corresponds, for example, to operation of the machine at maturity, there is much learning data, both healthy and abnormal, available, and furthermore for each possible type of anomaly. In this phase it is possible to assign, in a conventional manner, an indicator score to each signal (not necessarily to signal pairs) since there are then sufficient numbers of data. The data is classified as normal or abnormal (and the type of anomaly), according to the indicator scores.

The invention is naturally not limited to the method as described above and also applies, understandably, to a system configured for implementing this method, and in particular to a system for the analysis of the operational state of a machine, such as an aircraft engine, comprising a module for acquisition of a signal provided by a sensor associated with the machine and a reference database wherein are recorded one or more thresholds for one or more indicators calculated from signals provided by the sensor associated with the machine, characterised in that it moreover comprises:

a module for calculating deviation signals 4 configured to form, for each of the signals characteristic of normal operation, at least one so-called deviation signal through the implementation of a mathematical operation whose attributes are the signal characteristic of normal operation and one of the signals characteristic of normal or abnormal operation other than said signal characteristic of normal operation;

a module for calculating indicators configured to calculate, for each of the deviation signals, an indicator;

a module for determination of the thresholds of indicators configured to determine, from the deviation signal indicators, an indicator threshold representative of a limit between normal operation and abnormal operation of the machine, said threshold allowing the deviation signals, formed from a signal characteristic of normal operation and from another signal characteristic of normal operation, to be distinguished from deviation signals formed from a signal characteristic of normal operation and from a signal characteristic of abnormal operation, and to record the indicator threshold in the reference database.

And the invention also applies to a software implementation of the method and thus to a computer program product which comprises code instructions for the execution of the steps in the method according to the invention when said program is executed on a computer.

The invention claimed is:

1. A method of analyzing an operational state of a machine comprising:
   a learning step to provide information to a reference database on one or more thresholds for one or more indicators calculated from signals provided by one or more sensors associated with the machine,
   wherein the learning step is implemented by a computerized processing unit and comprises:
   acquiring signals characteristic of normal operation of the machine and signals characteristic of abnormal operation of the machine;
   for each of the signals characteristic of normal operation of the machine, calculating a mathematical operation whose attributes are the signal characteristic of normal operation of the machine and one of the signals characteristic of normal or abnormal operation of the machine other than said signal characteristic of normal operation, the result of said calculating being a signal called deviation signal;
   for each of the deviation signals, calculating an indicator;
   determining, from the calculated indicators, an indicator threshold that allows distinguishing deviation signals calculated from a signal characteristic of normal operation of the machine and from another signal characteristic of normal operation of the machine from deviation signals calculated from a signal characteristic of normal operation of the machine and from a signal characteristic of abnormal operation of the machine; and
   recording the indicator threshold in the reference database.

2. The method according to claim 1, further comprising a machine test step with a signal provided by a sensor associated with the machine, wherein the machine test step comprises the operations of:
   forming a test signal by implementing said mathematical operation whose attributes are the signal provided by the sensor and a reference signal;
   calculating an indicator of the test signal;
   comparing the test signal indicator with the indicator threshold recorded in the reference database, in order to determine the operational state of the machine.

3. The method according to claim 1, wherein the signals provided by the sensor are transformed into the frequency domain prior to calculating the deviation signals.

4. The method according to claim 3, wherein the signals provided by the sensor are sampled over a measurement period during which an engine speed of the machine is variable, wherein the sampled signals are synchronized according to variations in the engine speed over the measurement period, and wherein the synchronized sampled signals are transformed into the frequency domain in order to obtain frequency lines ordered according to a shaft rotation speed.

5. The method according to claim 1, wherein each calculated indicator is one from amongst a statistical moment of the signal and an energy of the signal.

6. The method according to claim 1, wherein the calculating a deviation signal indicator is performed by counting a number of points in the deviation signal subtracted from a signal characteristic of normal operation of the machine that are present outside an envelope of said signal characteristic of normal operation of the machine.

7. The method according to claim 1, wherein calculating a deviation signal indicator is performed by counting a number of peaks from amongst n peaks in the signal characteristic of normal operation of the machine which coincide with a peak from amongst p peaks of the signal subtracted from said signal characteristic of normal operation of the machine.

8. The method according claim 1, wherein the learning step comprises a secondary phase during which a signal characteristic of normal operation of the machine is formed by combining several signals characteristic of normal operation of the machine.

9. The method according to claim 1, wherein the sensor is an acoustic sensor or a vibratory sensor.

10. The method according to claim 1, wherein calculating the at least one deviation signal is performed through calculating said mathematical operation between the signal characteristic of normal operation of the machine and each of the signals characteristic of normal or abnormal operation of the machine other than said signal characteristic of normal operation of the machine.

11. The method according to claim 1, wherein said mathematical operation is a subtraction.

12. A non-transitory computer readable medium storing program instructions for causing a computer to perform the method according to claim 1.

13. A system for the analysis of an operational state of a machine, comprising:
a module for acquiring a signal provided by a sensor associated with the machine;
a reference database wherein are recorded one or more thresholds for one or more indicators calculated from signals provided by said sensor;
a module for calculating deviation signals configured to calculate, for each of signals characteristic of normal operation of the machine, at least one deviation signal by implementing a mathematical operation whose attributes are the signal characteristic of normal operation of the machine and one signals characteristic of normal or abnormal operation of the machine other than said signal characteristic of normal operation of the machine;
a module for calculating indicators configured to calculate, for each of the deviation signals, an indicator; and
a module for determining indicator thresholds configured to determine, from the deviation signal indicators, an indicator threshold allowing the deviation signals, formed from a signal characteristic of normal operation of the machine and from another signal characteristic of normal operation of the machine, to be distinguished from deviation signals formed from a signal characteristic of normal operation of the machine and from a signal characteristic of abnormal operation of the machine, and for recording the indicator threshold in the reference database.

* * * * *